(12) United States Patent
Takamatsu et al.

(10) Patent No.: US 8,127,564 B2
(45) Date of Patent: Mar. 6, 2012

(54) COOLING SYSTEM

(75) Inventors: Naoyoshi Takamatsu, Susono (JP); Takeshi Yamazaki, Shibuya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 475 days.

(21) Appl. No.: 12/515,861

(22) PCT Filed: Feb. 6, 2008

(86) PCT No.: PCT/JP2008/052387
§ 371 (c)(1),
(2), (4) Date: May 21, 2009

(87) PCT Pub. No.: WO2008/096899
PCT Pub. Date: Aug. 14, 2008

(65) Prior Publication Data
US 2010/0050676 A1    Mar. 4, 2010

(30) Foreign Application Priority Data

Feb. 7, 2007  (JP) ................................. 2007-028137

(51) Int. Cl.
*B60H 1/32*  (2006.01)
*B60K 1/00*  (2006.01)
*H01M 10/50*  (2006.01)

(52) U.S. Cl. .............. 62/239; 62/244; 180/65.1; 429/62

(58) Field of Classification Search ............. 62/239, 62/244, 185, 259.2; 180/65.1, 65.22, 68.5; 429/62, 120
See application file for complete search history.

(56) References Cited

U.S. PATENT DOCUMENTS 5,624,003 A  4/1997  Matsuki et al.
5,730,237 A  3/1998  Matsuki et al.

FOREIGN PATENT DOCUMENTS

| JP | 06-024238 A | 2/1994 |
| JP | 06-231807 A | 8/1994 |
| JP | 2002-352866 A | 12/2002 |
| JP | 2005-176484 A | 6/2005 |

*Primary Examiner* — Chen Wen Jiang
(74) *Attorney, Agent, or Firm* — Sughrue Mion, PLLC

(57) ABSTRACT

A cooling system has a configuration in which a cooling system for an inverter device and a motor generator also serves as a cooling system for a battery. In this configuration, a control device performs temperature-raising control of the battery when a battery temperature is below a prescribed temperature lower limit value. The control device controls an operation of a switching valve such that cooling water from a cooling medium path is outputted to a bypass path. Further, if a cooling water temperature is lower than a prescribed temperature, the control device controls the inverter device such that a power loss during a switching operation in a switching element included in the inverter device becomes larger than a power loss during normal control. As a result, the cooling system having a small-sized, low-cost configuration rapidly recovers capacity decline of the battery, which occurs at low temperatures.

11 Claims, 10 Drawing Sheets

COOLING SYSTEM

TECHNICAL FIELD

The present invention relates to a cooling system, and particularly relates to a cooling system for a load drive circuit.

BACKGROUND ART

In recent years, attention has been focused on a vehicle that uses an electric motor as a drive power source, such as an electric vehicle, a hybrid vehicle, or a fuel-cell vehicle, from an environmental standpoint. Such a vehicle is mounted with a power storage mechanism made of a secondary battery or an electric double layer capacitor, for supplying electric power to the electric motor and for converting kinetic energy into electric energy and storing the same during regenerative braking.

In such a vehicle that uses an electric motor as a drive power source, it is desirable to increase a charge/discharge capacity of the power storage mechanism so as to improve traveling performance such as acceleration performance or continuous traveling distance.

On the other hand, the power storage mechanism utilizes an electrochemical action to store electric energy, so that its charge/discharge properties tend to be influenced by temperatures. In a typical power storage mechanism, its charge/discharge performance is deteriorated as the temperature decreases. Therefore, temperature management, particularly temperature-raising control, of the power storage mechanism is important to maintain prescribed charge/discharge performance.

For example, Japanese Patent Laying-Open No. 06-24238 discloses a battery temperature control device that controls a temperature of the battery mounted on an electric vehicle to fall within an appropriate temperature range. According to the document, the battery temperature control device includes a circulating water channel for cooling/heating the battery. The circulating water channel is provided to allow cooling water inside a thermal insulating vessel for the battery to circulate to a radiator that exchanges heat with air outside the vehicle or to a heat core that exchanges heat with air inside the vehicle, and also allow the cooling water to circulate to an inverter and a motor both identified as a heat-generating member that generates heat by the startup of the vehicle. When the temperature of the battery is lower than an appropriate temperature during charging in winter or the like, when the temperature of the battery is lower than an appropriate temperature at startup, or when the ignition is turned on and the vehicle speed is zero, the battery temperature control device heats the battery by means of an electric heater provided at the thermal insulating vessel for the battery. In contrast, if the vehicle speed is not zero (i.e. during traveling) and the motor and the inverter are at a temperature at or above an appropriate temperature, the battery temperature control device heats the battery by utilizing heat released by the motor and the inverter.

Further, Japanese Patent Laying-Open No. 06-231807 discloses a battery-warming device for an electric vehicle, having batteries disposed around a fuel-fired heater for warming a vehicle chamber, and having transmitting means for transmitting exhaust heat of the fuel-fired heater being in an operating state to the battery.

As to the battery temperature control device disclosed in Japanese Patent Laying-Open No. 06-24238, there is disclosed a configuration that utilizes heat released by the motor and the inverter to heat the battery. However, if the motor and the inverter are at a temperature lower than an appropriate temperature, such as at the startup or at a vehicle speed of zero, there is adopted a configuration in which the electric heater is turned on to heat the battery.

Therefore, in Japanese Patent Laying-Open No. 06-24238, it is necessary to provide the electric heater and a power supply for the electric heater at the thermal insulating vessel for the battery, and hence there arises a problem of increase in size and cost of the battery temperature control device.

Further, as to the battery-warming device disclosed in Japanese Patent Laying-Open No. 06-231807, there is disclosed a configuration in which the fuel-fired heater is disposed at the center of a battery tray, and a plurality of batteries are disposed around the fuel-fired heater. Therefore, it is difficult to achieve reduction in size and cost of the battery.

The present invention has been made to solve these problems. An object of the present invention is to provide a cooling system capable of raising a temperature of a power storage mechanism by a small-sized, low-cost device configuration.

DISCLOSURE OF THE INVENTION

According to the present invention, a cooling system includes: a load drive device having a power storage mechanism configured to be chargeable/dischargeable, and a drive circuit receiving supply of electric power from the power storage mechanism and driving an electric load; a cooling device cooling the load drive device; and a control device controlling an operation of the load drive device and an operation of the cooling device. The cooling device includes a cooling medium path allowing a cooling medium to pass therethrough. The power storage mechanism is disposed to share the cooling medium path with the drive circuit. The control device includes a temperature-raising control unit performing temperature-raising control of the power storage mechanism when a temperature of the power storage mechanism is below a prescribed temperature lower limit value. The temperature-raising control unit includes an estimation unit estimating an amount of heat generated from the drive circuit, and a drive control unit controlling the drive circuit such that a power loss generated at the drive circuit becomes larger than a power loss during normal control, when the amount of heat generated from the drive circuit, estimated by the estimation unit, falls short of an amount of heat required for warming the power storage mechanism.

According to the above-described cooling system, in the configuration in which the cooling system for the drive circuit also serves as the cooling system for the power storage mechanism, if an amount of heat generated from the drive circuit is insufficient for performing temperature-raising control during temperature-raising control of the power storage mechanism, a power loss of the drive circuit is increased. It is thereby possible to rapidly recover capacity decline of the power storage mechanism by means of the cooling medium that exchanges heat with the drive circuit that generates an increased amount of heat. Consequently, the cooling system having a small-sized, low-cost configuration enables charge/discharge performance of the power storage mechanism to be ensured, and operational reliability of the electric load to be improved.

Preferably, the cooling device includes a radiator disposed at the cooling medium path and cooling the cooling medium, a bypass path for bypassing the radiator, and a switching valve allowing the cooling medium to pass through any of the radiator and the bypass path. The temperature-raising control unit further includes a switching valve control unit controlling an operation of the switching valve such that the cooling medium passes through the bypass path.

According to the above-described cooling system, the cooling medium circulates without passing through the radiator when temperature-raising control is performed. Therefore, it is possible to efficiently transport heat generated from the drive circuit to the power storage mechanism, and as a result, rapidly warm the power storage mechanism.

Preferably, the drive circuit includes an electric power converter which performs electric power conversion between the power storage mechanism and the electric load by a switching operation of a switching element. The drive control unit controls the drive circuit such that a power loss generated during the switching operation becomes larger than the power loss during the normal control.

According to the above-described cooling system, by increasing a power loss during a switching operation to increase an amount of heat generated from the drive circuit, it is possible to rapidly recover capacity decline of the power storage mechanism, which occurs at low temperatures.

Preferably, the drive control unit controls a drive power supply of the switching element such that conduction resistance in a state where the switching element is turned on becomes higher than conduction resistance during the normal control.

According to the above-described cooling system, by increasing a steady loss obtained when the switching element is turned on to increase an amount of heat generated from the drive circuit, it is possible to rapidly recover capacity decline of the power storage mechanism, which occurs at low temperatures.

Preferably, the drive control unit controls a drive power supply of the switching element such that conduction resistance in a state where the switching element is turned off becomes lower than conduction resistance during a normal operation.

According to the above-described cooling system, by increasing a steady loss obtained when the switching element is turned off to increase an amount of heat generated from the drive circuit, it is possible to more rapidly recover capacity decline of the power storage mechanism, which occurs at low temperatures.

Preferably, the drive control unit controls the drive circuit such that a switching speed of the switching element becomes lower than a switching speed during a normal operation.

According to the above-described cooling system, by increasing a switching loss generated during a switching operation to increase an amount of heat generated from the drive circuit, it is possible to rapidly recover capacity decline of the power storage mechanism, which occurs at low temperatures.

Preferably, the drive control unit switches an electrical resistor electrically connected between a drive power supply of the switching element and a control electrode of the switching element, from a first resistance value to a second resistance value larger than the first resistance value.

According to the above-described cooling system, a switching loss can be increased by a simple configuration, so that the small-sized, low-cost device configuration makes it possible to rapidly recover capacity decline of the power storage mechanism, which occurs at low temperatures.

Preferably, the electric load is a rotating electrical machine, and the drive control unit controls the drive circuit such that driving efficiency of the rotating electrical machine becomes lower than driving efficiency during a normal operation.

According to the above-described cooling system, by decreasing driving efficiency of the rotating electrical machine, a drive current that flows through the rotating electrical machine is increased and an amount of heat generated by the drive circuit itself is increased, so that it is possible to rapidly recover capacity decline of the power storage mechanism, which occurs at low temperatures.

Preferably, the rotating electrical machine operates at a first operating point which requires a drive current having a first current amplitude for generating requested torque, during the normal operation. The drive control unit controls the drive circuit such that the rotating electrical machine operates at a second operating point which requires a drive current having a second current amplitude for generating the same requested torque, the second current amplitude being larger than the first current amplitude.

According to the above-described cooling system, by increasing a drive current that flows through the rotating electrical machine, an amount of heat generated from the drive circuit is increased, so that it is possible to rapidly recover capacity decline of the power storage mechanism, which occurs at low temperatures. Further, the drive circuit and the rotating electrical machine are warmed by self-heating, and hence operational reliability of the electric load is improved.

Preferably, the estimation unit estimates the amount of heat generated from the drive circuit, based on any of a temperature of the cooling medium, a temperature of the drive circuit, and a drive current flowing through the drive circuit.

According to the above-described cooling system, it is possible to easily estimate an amount of heat generated from the drive circuit.

Preferably, the power storage mechanism is disposed to share the cooling medium path further with the electric load.

According to the above-described cooling system, it is possible to more efficiently and rapidly warm the power storage mechanism by the cooling medium that exchanges heat with the drive circuit and the electric load that generate heat.

According to the present invention, the small-sized, low-cost device configuration enables rapid increase in temperature of the power storage mechanism.

BEST MODES FOR CARRYING OUT THE INVENTION

Figure 1:
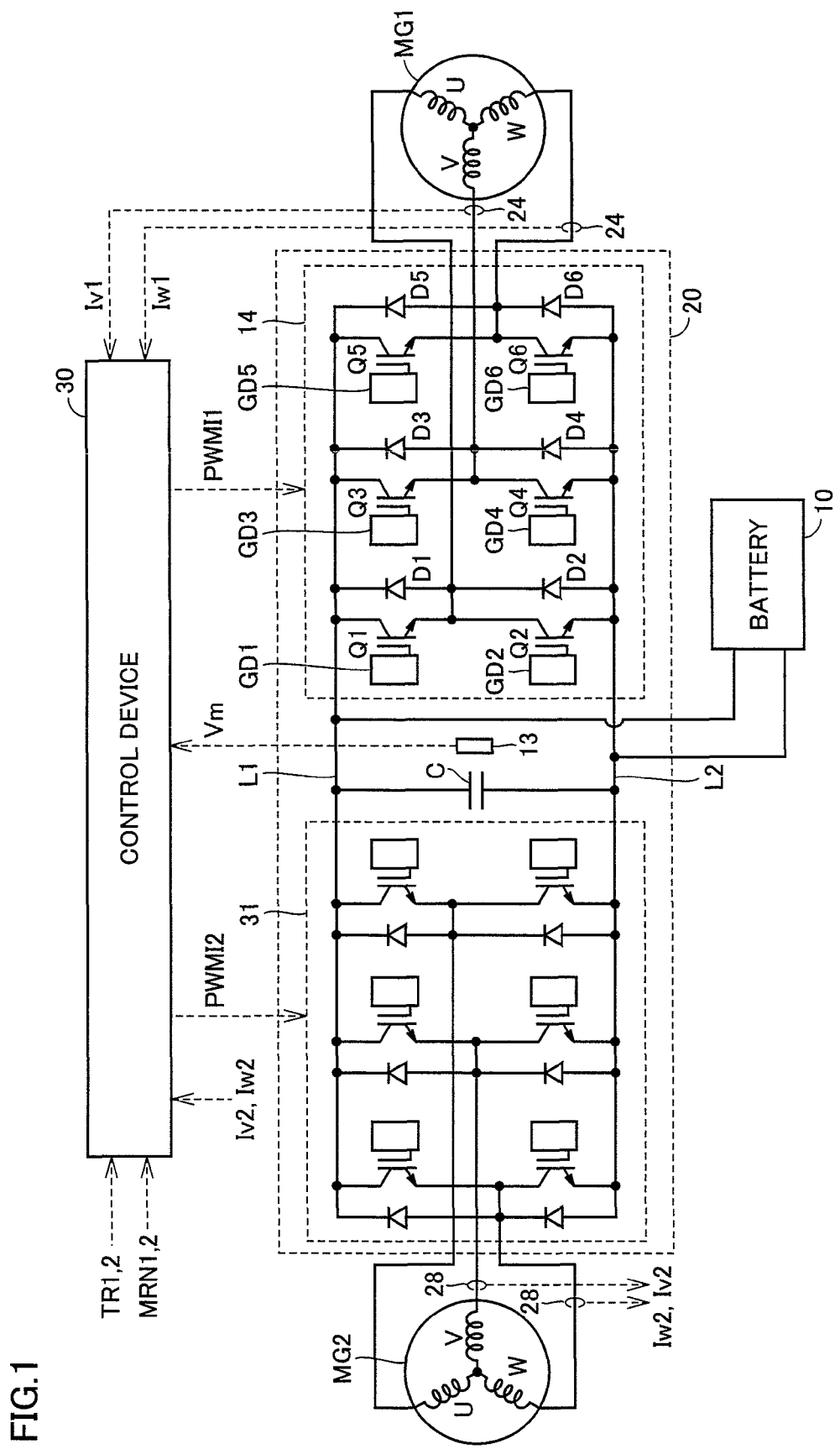
FIG. 1 is a circuit diagram for describing a configuration of a load drive device to which a cooling system according to the present invention is applied.

An embodiment of the present invention will hereinafter be described in detail with reference to the drawings. It is noted that the same reference characters in the drawings show the same or corresponding portions.

FIG. 1 is a circuit diagram for describing a configuration of a load drive device to which a cooling system according to the present invention is applied.

With reference to FIG. 1, the load drive device includes motor generators MG1, MG2, an inverter device 20, a battery 10, current sensors 24, 28, and a control device 30.

Each of motor generators MG1, MG2 is a three-phase alternating-current synchronous electric motor generator, and includes a rotor having a plurality of permanent magnets at an outer peripheral surface, and a stator around which a three-phase coil for generating a rotating magnetic field is wound. Each of motor generators MG1, MG2 operates as an electric motor that rotates and drives the rotor by an interaction between a magnetic field caused by the permanent magnets and a magnetic field formed by the three-phase coil, and also operates as a power generator that generates electromotive force across the three-phase coil by an interaction between the magnetic field caused by the permanent magnets and rotation of the rotor.

Battery 10 configures a "power storage mechanism" configured to be chargeable/dischargeable, and is formed of, for example, a secondary battery such as a nickel-hydrogen battery or a lithium-ion battery, or an electric double layer capacitor. Battery 10 supplies a direct-current voltage to inverter device 20, and is charged with a direct-current voltage from inverter device 20.

Inverter device 20 includes an inverter 14 provided to correspond to motor generator MG1, an inverter 31 provided to correspond to motor generator MG2, a smoothing capacitor C, a power supply line L1, a ground line L2, and a voltage sensor 13.

Smoothing capacitor C is connected between power supply line L1 and ground line L2, and smoothes an output voltage of battery 10, namely, an input voltage of inverters 14, 31. Voltage sensor 13 detects a voltage Vm across smoothing capacitor C (i.e. which voltage corresponds to an input voltage of inverters 14, 31, and the same applies to the following), and outputs the detected voltage Vm to control device 30.

Inverter 14 has a configuration of a typical three-phase inverter, and includes switching elements Q1, Q2 that configure a U-phase arm, switching elements Q3, Q4 that configure a V-phase arm, and switching elements Q5, Q6 that configure a W-phase arm. Antiparallel diodes D1-D6 are connected to correspond to switching elements Q1-Q6, respectively, to allow a current to flow from the emitter side to the collector side. Each of U, V, and W-phase arms of inverter 14 is connected to a corresponding phase of motor generator MG1. As the switching element in this embodiment, it is possible to apply an IGBT (Insulated Gate Bipolar Transistor), a MOS-FET (Metal Oxide Semiconductor-Field Effect Transistor), or the like.

A configuration of inverter 31 is similar to the configuration of inverter 14, and hence the detailed description thereof will not be repeated. Each of U, V, and W-phase arms of inverter 31 is connected to a corresponding phase of motor generator MG2.

Current sensor 24 detects motor currents Iv1, Iw1 flowing through motor generator MG1, and outputs the detected motor currents Iv1, Iw1 to control device 30. Current sensor 28 detects motor currents Iv2, Iw2 flowing through motor generator MG2, and outputs the detected motor currents Iv2, Iw2 to control device 30.

Control device 30 controls switching operations of switching elements Q1-Q6 in inverter 14 to control inverter 14, so as to cause motor generator MG1 to generate torque in accordance with a motor torque command based on electric power supplied from battery 10, or to change alternating-current electric power generated by motor generator MG1 into direct-current electric power to charge battery 10.

Specifically, control device 30 receives a torque command value TR1 and a motor rotation speed MRN1 from an external ECU (Electrical Control Unit) not shown, receives output voltage Vm from voltage sensor 13, and receives motor currents Iv1, Iw1 from current sensor 24. Based on these output values, control device 30 generates a signal PWMI1 for controlling switching of switching elements Q1-Q6 in inverter 14 when inverter 14 drives motor generator MG1 by a method described below, and outputs the generated signal PWMI1 to inverter 14.

In other words, signal PWMI1 is on/off control signals for switching elements Q1-Q6 in inverter 14, and switching elements Q1-Q6 are opened/closed by gate drive circuits GD1-GD6 in response to these on/off control signals.

Control device 30 further controls switching operations of switching elements Q1-Q6 in inverter 31 to control inverter 31, so as to cause motor generator MG2 to generate torque in accordance with a motor torque command based on electric power supplied from battery 10, or to change alternating-current electric power generated by motor generator MG2 into direct-current electric power to charge battery 10. Specifically, based on torque command value TR2 and motor rotation speed MRN2 from the external ECU, output voltage Vm from voltage sensor 13, and motor currents Iv2, Iw2 from current sensor 28, control device 30 generates a signal PWMI2 for controlling switching of switching elements Q1-Q6 in inverter 31 when inverter 31 drives motor generator MG2, and outputs the generated signal PWMI2 to inverter 31.

It is noted that in the description above, inverter device 20 that includes inverters 14, 31 and smoothing capacitor C configures a "load drive device". If the load drive device is considered as a driving force generating unit that generates driving force of the vehicle, the vehicle travels by transmitting to the wheels the driving force generated by electric power supplied from battery 10 to the driving force generating unit. Further, during regenerative braking, the vehicle causes the driving force generating unit to generate electric power from kinetic energy, and recapture the electric power in battery 10.

Figure 2:
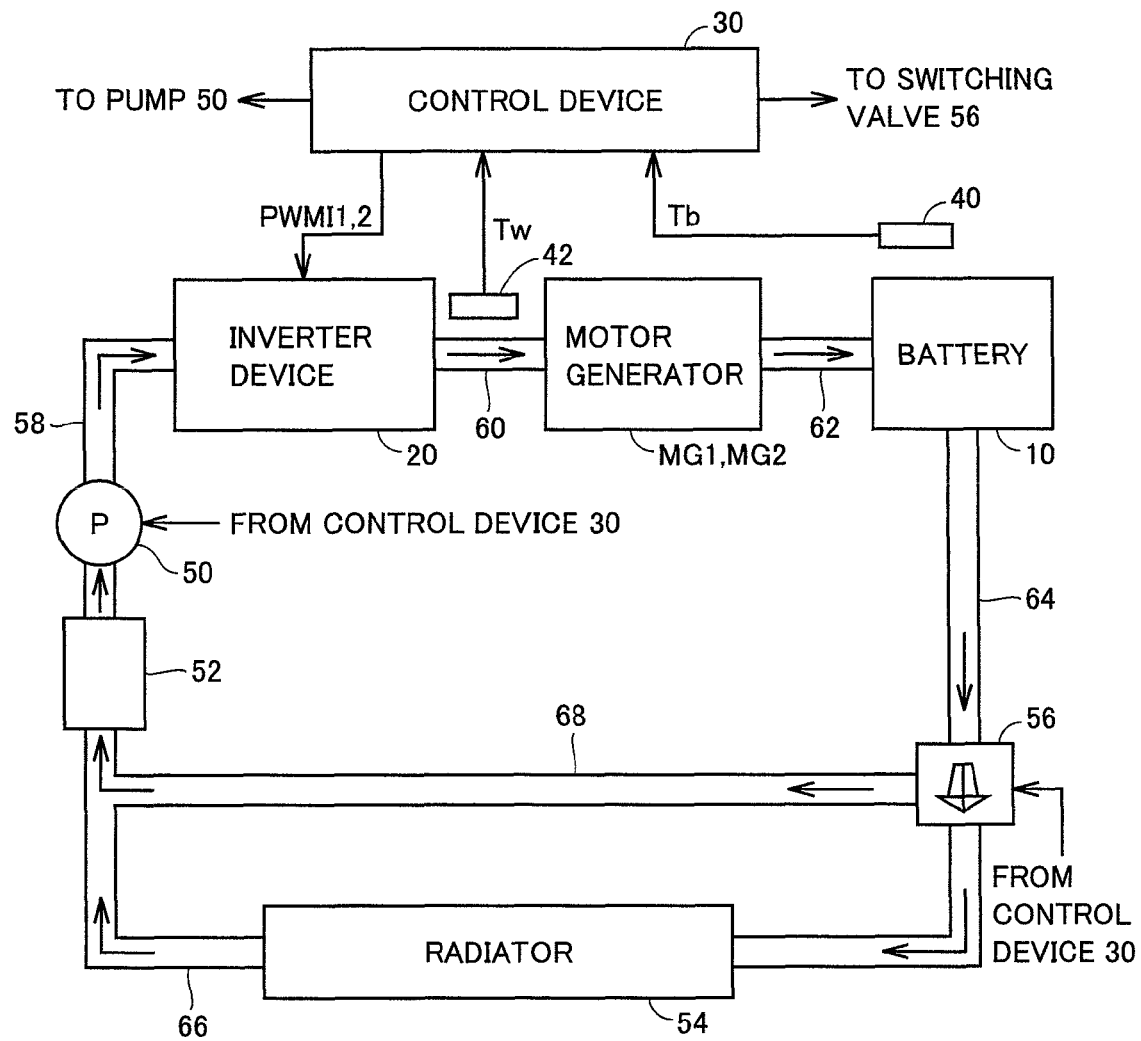
FIG. 2 is a block diagram that schematically shows the cooling system for the load drive device shown in FIG. 1.

FIG. 2 is a block diagram that schematically shows the cooling system for the load drive device shown in FIG. 1.

With reference to FIG. 2, the cooling system includes inverter device 20, motor generators MG1, MG2, battery 10, an electric-powered pump (hereinafter referred to as a pump) 50, a reservoir tank 52, a radiator 54, and cooling medium paths 58-66.

Cooling medium path 58 is provided between pump 50 and inverter device 20. Cooling medium path 60 is provided between inverter device 20 and motor generators MG1, MG2. Cooling medium path 62 is provided between battery 10 and motor generators MG1, MG2. Further, cooling medium path 64 is provided between battery 10 and a first port of radiator 54, and cooling medium path 66 is provided between a second port of radiator 54 and reservoir tank 52.

Pump 50 is a pump for circulating cooling water such as an antifreeze solution, and circulates a cooling medium in a direction of a shown arrow. Radiator 54 cools the cooling medium that has been circulated through inverter device 20, motor generators MG1, MG2, and battery 10. The cooling water cooled in radiator 54 is temporarily stored in reservoir tank 52, and returns to pump 50.

In other words, in the cooling system according to the present invention, inverter device 20, motor generators MG1, MG2, and battery 10 are cooled by a single cooling system. In the description above, inverter device 20, motor generators MG1, MG2, and battery 10 are successively disposed in this order on an upstream side when seen from radiator 54. However, the order in which these devices are disposed is not limited thereto.

As described above, according to the present invention, cooling water for inverter device 20 and motor generators MG1, MG2 is used to cool battery 10, so that the cooling system for inverter device 20 and motor generators MG1, MG2 can also serve as the cooling system for battery 10, and hence reduction in size and cost of the cooling system is achieved.

Further, the cooling system is reduced in weight, so that the vehicle mounted with the load drive device is reduced in weight, and as a result, fuel efficiency of the vehicle is improved.

Further, according to the present invention, by utilizing the feature that cooling water for inverter device 20 and motor generators MG1, MG2 also serves as cooling water for battery 10, charge/discharge performance of battery 10 in a low-temperature environment is ensured. In other words, by transporting heat generated from inverter device 20 and motor generators MG1, MG2 to battery 10 by means of cooling water and using the heat to warm battery 10, it is possible to recover capacity decline of battery 10, which occurs at low temperatures.

Specifically, as shown in FIG. 2, the cooling system further includes a bypass path 68, a switching valve 56, and temperature sensors 40, 42.

Switching valve 56 is provided at cooling medium path 64 between battery 10 and radiator 54. Switching valve 56 switches an output destination of the cooling water that has passed through cooling medium path 64 to any of radiator 54 and bypass path 68.

Bypass path 68 is a bypass for bypassing radiator 54, and provided between cooling medium path 66 and switching valve 56.

Temperature sensor 40 detects a temperature Tb of battery 10 (hereinafter referred to as a battery temperature), and outputs the detected battery temperature Tb to control device 30. Temperature sensor 42 detects a temperature Tw of the cooling water (hereinafter referred to as a cooling water temperature), and outputs the detected cooling water temperature Tw to control device 30.

Control device 30 controls a switching operation in inverter device 20 described above, and also controls driving of pump 50 for circulating cooling water. Driving of pump 50 is controlled by setting a target value of a flow rate in consideration of a pressure loss at the flow passage through which cooling water passes through inverter device 20, motor generators MG1, MG2, and battery 10, and an amount of heat generated by each of the devices, and controlling a rotation speed of pump 50 such that its flow rate takes the set target value.

Further, control device 30 determines whether or not it is necessary to raise the temperature of battery 10 based on battery temperature Tb from temperature sensor 40. Specifically, control device 30 determines whether or not battery temperature Tb is below a prescribed temperature lower limit value Tb_lim. If battery temperature Tb is below temperature lower limit value Tb_lim, control device 30 performs temperature-raising control of battery 10.

(Temperature-Raising Control of Battery)

Temperature-raising control of battery 10 is performed by controlling an operation of switching valve 56 in accordance with battery temperature Tb. Specifically, when battery temperature Tb is at least temperature lower limit value Tb_lim, namely, during normal control which is not temperature-raising control, control device 30 controls an operation of switching valve 56 such that cooling water from cooling medium path 64 is outputted to radiator 54. In contrast, when battery temperature Tb is below temperature lower limit value Tb_lim, namely, when temperature-raising control is to be performed, control device 30 controls an operation of switching valve 56 such that cooling water from cooling medium path 64 is outputted to bypass path 68.

As such, by controlling an operation of switching valve 56 in accordance with battery temperature Tb, cooling water circulates without passing through radiator 54 when temperature-raising control is performed, so that the cooling water warmed by inverter device 20 and motor generators MG1, MG2 is prevented from being cooled by radiator 54. Consequently, it is possible to efficiently warm battery 10, and recover capacity decline of battery 10, which occurs at low temperatures.

However, in the configuration that uses inverter device 20 and motor generators MG1, MG2 as a heat-generating member and uses heat generated from the heat-generating member to warm battery 10 as such, if an amount of heat generated from the heat-generating member is small, such as at startup of the load drive device, it may be difficult to warm battery 10.

Therefore, the cooling system according to the present invention adopts a configuration that controls inverter device 20 such that a power loss generated at inverter device 20 becomes larger than a power loss during normal control, if an amount of heat generated at inverter device 20 and motor generators MG1, MG2 is less than an amount of heat required for warming battery 10 during temperature-raising control of battery 10.

With such a configuration, an amount of heat generated from inverter device 20 is increased, so that it is possible to quickly warm battery 10. It is noted that this control that increases a power loss of inverter device 20 will hereinafter be also referred to as "loss-increasing control".

(Loss-Increasing Control of Inverter Device)

Initially, control device 30 estimates an amount of heat generated at inverter device 20 and motor generators MG1, MG2, and determines whether or not the estimated amount of generated heat is at least an amount of heat required for warming battery 10. As an example, control device 30 estimates an amount of heat generated at inverter device 20 and motor generators MG1, MG2 based on cooling water temperature Tw from temperature sensor 42, and determines whether or not the estimated amount of generated heat is at least an amount of heat required for warming battery 10.

At this time, if cooling water temperature Tw is lower than a prescribed temperature Tw_std preset based on the amount of heat required for warming battery 10, control device 30 determines that the amount of heat generated at inverter device 20 and motor generators MG1, MG2 falls short of the amount of heat required for warming battery 10. Control device 30 thus performs loss-increasing control of inverter device 20. In contrast, if cooling water temperature Tw is at least prescribed temperature Tw_std, control device 30 determines that the amount of heat generated at inverter device 20 and motor generators MG1, MG2 is at least the amount of heat required for warming battery 10, and performs normal control of inverter device 20.

It is noted that although the amount of heat generated at inverter device 20 and motor generators MG1, MG2 is estimated based on cooling water temperature Tw from temperature sensor 42 in the description above, it may also be possible to adopt a configuration that estimates the amount of generated heat based on a temperature detection value of a temperature sensor that detects a device temperature of inverter device 20, and a detection value of a temperature sensor that detects a motor temperature of motor generators MG1, MG2. Alternatively, it may also be possible to adopt a configuration that estimates the amount of generated heat based on motor currents Iv1, Iw1 from current sensor 24.

Next, as described below, when performing loss-increasing control, control device 30 controls inverters 14, 31 such that a power loss during switching operations in switching elements Q1-Q6 included in inverter device 20 becomes larger than a power loss during normal control.

Figure 3:
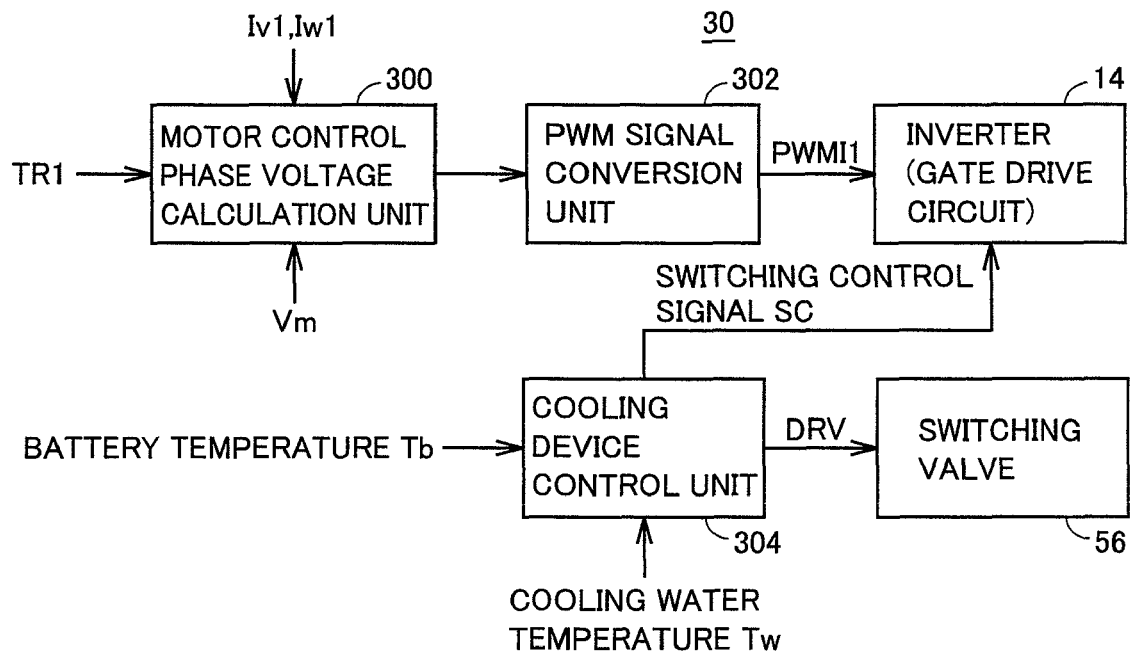
FIG. 3 is a functional block diagram of the control device in FIG. 2.

FIG. 3 is a functional block diagram of control device 30 in FIG. 2.

It is noted that although control of inverter 14 in inverter device 20 will be described as a representative example in FIG. 3 to FIG. 15 below, inverter 31 in inverter device 20 is similarly controlled.

With reference to FIG. 3, control device 30 includes a motor control phase voltage calculation unit 300, a PWM signal conversion unit 302, and a cooling device control unit 304.

Motor control phase voltage calculation unit 300 receives from voltage sensor 13 a voltage across smoothing capacitor C, namely, input voltage Vm to inverter 14, receives from current sensor 24 motor currents Iu1, Iv1 flowing through motor generator MG1, and receives from the external ECU torque command value TR1. Based on these inputted signals, motor control phase voltage calculation unit 300 then computes a voltage to be applied to each phase of motor generator MG1, and outputs the result of the calculation to PWM signal conversion unit 302.

Based on the result of the calculation received from motor control phase voltage calculation unit 300, PWM signal conversion unit 302 generates signal PWMI1 for actually turning on/off each of switching elements Q1-Q6 in inverter 14, and outputs the generated signal PWMI1 to each of switching elements Q1-Q6 in inverter 14. Switching elements Q1-Q6 are opened/closed by gate drive circuits GD1-GD6 in response to signal PWMI1.

Upon receipt of battery temperature Tb from temperature sensor 40 and cooling water temperature Tw from temperature sensor 42, cooling device control unit 304 determines whether or not battery temperature Tb is below prescribed temperature lower limit value Tb_lim. If battery temperature Tb is below prescribed temperature lower limit value Tb_lim, cooling device control unit 304 performs temperature-raising control of battery 10.

In the temperature-raising control, cooling device control unit 304 generates a signal DRV for controlling an operation of switching valve 56 such that cooling water from cooling medium path 64 is outputted to bypass path 68, and outputs the generated signal DRV to switching valve 56. The cooling water thereby circulates without passing through radiator 54 (FIG. 2), and hence the cooling water warmed by inverter device 20 and motor generators MG1, MG2 is prevented from being cooled by radiator 54. As a result, it is possible to efficiently transport heat generated from inverter device 20 to battery 10 by means of the cooling water.

Further, cooling device control unit 304 determines whether or not cooling water temperature Tw from temperature sensor 42 is below prescribed temperature Tw_std. If cooling water temperature Tw is below prescribed temperature Tw_std, namely, if an estimated value of the amount of heat generated at inverter device 20 and motor generators MG1, MG2 falls short of an amount of heat required for warming battery 10, cooling device control unit 304 performs loss-increasing control of inverter device 20.

Specifically, cooling device control unit 304 generates a switching control signal SC and outputs it to inverter 14. Switching control signal SC is a signal for instructing to drive inverter 14 such that, while the load drive device is being operated, a power loss during switching operations in switching elements Q1-Q6 becomes larger than a power loss during normal control.

Here, a power loss Ploss generated at inverter 14 during a switching operation is expressed by the sum of a conduction loss Pon routinely generated while switching elements Q1-Q6 are in conduction, and a switching loss Psw generated when switching elements Q1-Q6 are turned on/off. Among them, the present embodiment increases conduction loss Pon to thereby increase an amount of heat generated from inverter 14.

Specifically, cooling device control unit 304 controls a switching operation of inverter 14 such that conduction resistance obtained in a state where switching elements Q1-Q6 are turned on becomes higher than conduction resistance during normal control.

Figure 4:
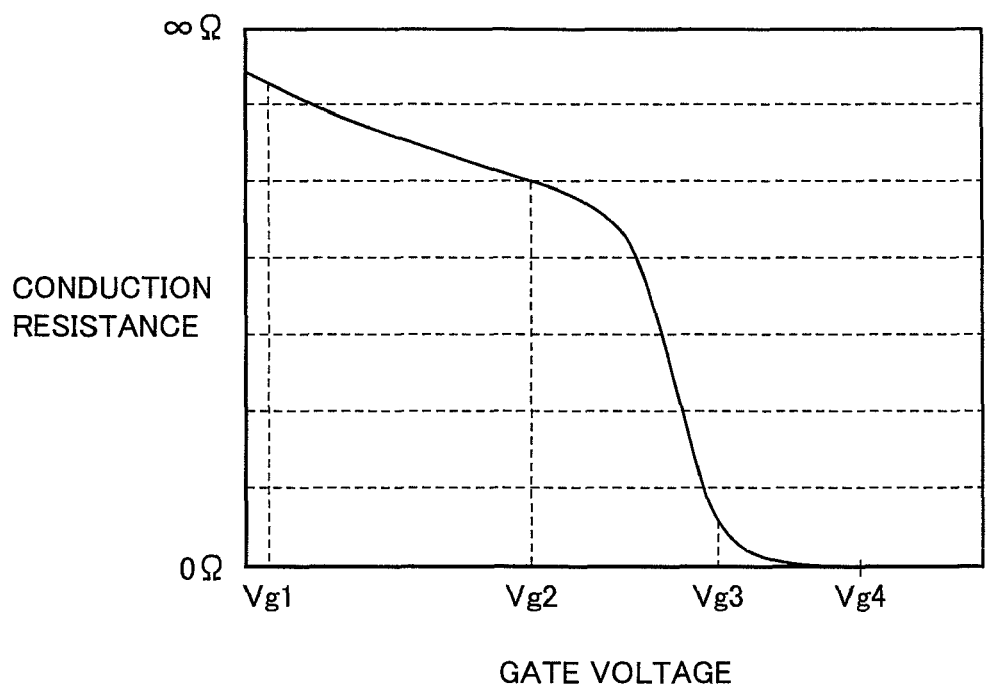
FIG. 4 is a drawing that shows a relationship between conduction resistance of a switching element and a gate voltage of the switching element.

FIG. 4 is a drawing that shows a relationship between conduction resistance of a switching element and a drive voltage applied to the gate of the switching element (hereinafter also referred to as a gate voltage).

With reference to FIG. 4, a lower gate voltage can cause higher conduction resistance of the switching element. During normal control, a gate voltage Vg4 is applied to the gate as an on-voltage so as to decrease conduction loss Pon. In contrast, during loss-increasing control, Vg3, which is lower than gate voltage Vg4 during normal control, is applied to the gate as an on-voltage. Thereby the conduction resistance of the switching element during loss-increasing control becomes higher than the conduction resistance during normal control, and as a result, conduction loss Pon of the switching element can be increased. Accordingly, an amount of heat generated from inverter device 20 is increased.

Further, cooling device control unit 304 controls a switching operation of inverter 14 such that conduction resistance obtained in a state where the switching element is turned off becomes lower than conduction resistance during normal control.

In other words, as shown in FIG. 4, a gate voltage Vg1 is applied as an off-voltage to the gate during normal control so as to allow a current in the switching element in an off-state to be approximately zero, namely, to increase conduction resistance. In contrast, during loss-increasing control, Vg2, which is higher than gate voltage Vg1 during normal control, is applied to the gate as an off-voltage. Thereby, during loss-increasing control, conduction resistance in the state where the switching element is turned off becomes lower than conduction resistance during normal control, and as a result, a current that corresponds to gate voltage Vg2 flows through the switching element. Therefore, even in the off-state, conduction loss Pon of the switching element is generated, so that an amount of heat generated from inverter device 20 can further be increased.

As described above, by adopting the configuration that varies a drive voltage (an on-voltage and an off-voltage) of the switching element between during normal control and during loss-increasing control, conduction resistance varies between in the state where the switching element is turned on and in the state where the switching element is turned off. As a result, as shown in FIG. 5 and FIG. 6, it is possible to increase conduction loss Pon generated during a switching operation when loss-increasing control is performed.

It is noted that the configuration that allows the drive voltage to be varied is implemented by, for example, gate drive circuits GD1-GD6, which correspond to switching elements Q1-Q6 in inverter 14, respectively, varying on-voltages and off-voltages to be applied to the gates of the switching elements, respectively, in accordance with switching control signal SC from cooling device control unit 304.

Figure 5:
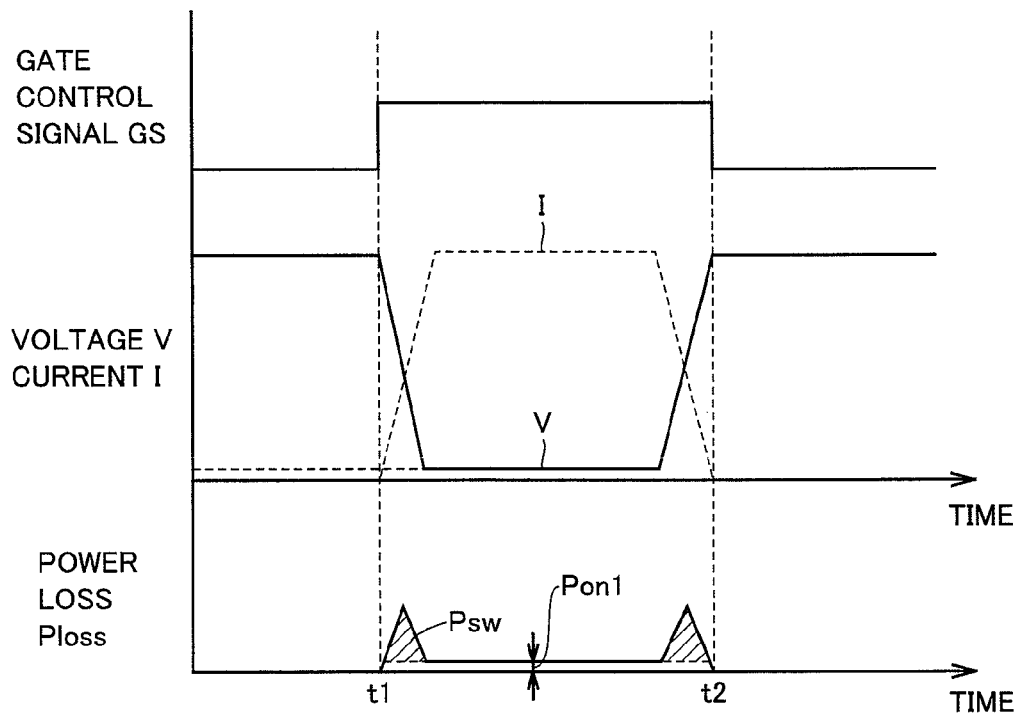
FIG. 5 is a drawing for describing a switching operation of an inverter device during normal control.
Figure 6:
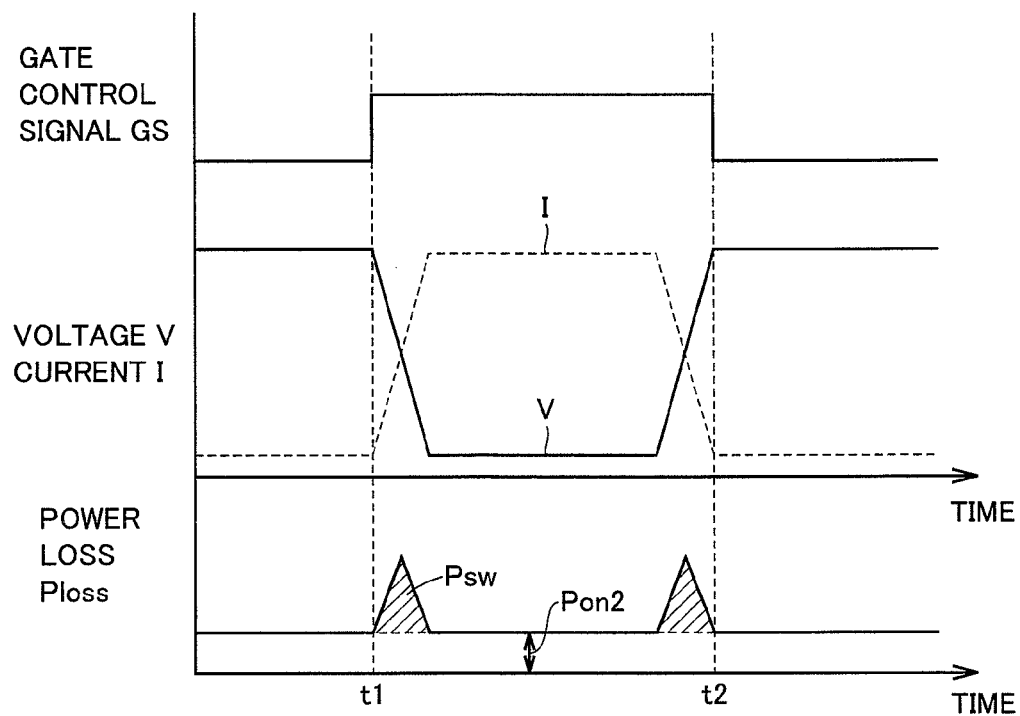
FIG. 6 is a drawing for describing a switching operation of the inverter device during loss-increasing control.

FIG. 5 is a drawing for describing a switching operation of inverter device 20 during normal control, while FIG. 6 is a drawing for describing a switching operation of inverter device 20 during loss-increasing control.

With reference to FIG. 5, an axis of ordinates shows a gate control signal GS that controls on/off of the switching element, a voltage V and a current I at the switching element, and power loss Ploss during a switching operation, and an axis of abscissas shows time. Gate control signal GS is set to a logic high level (H level) during an on-period of the switching element, and is set to a logic low level (L level) during an off-period of the switching element.

Before time t1, gate control signal GS is at the L level, so that voltage V≠0 whereas current I=0 in the switching element.

At time t1, when gate control signal GS changes from the L level to the H level, current I starts flowing and voltage V is decreased, in accordance with a change in gate voltage in response to gate control signal GS. In the completely on-state, voltage V becomes a voltage at the L level, which voltage is determined by properties of the switching element.

At time t2, when gate control signal GS changes from the H level to the L level, current I starts decreasing and voltage V increases, in accordance with a change in gate voltage in response to gate control signal GS. In the completely off-state, current I=0.

During an actual switching operation, voltage V and current I vary in accordance with a change in gate voltage caused by the gate drive circuit. Thereby power loss Ploss, which corresponds to the product of voltage V and current I, is generated at the switching element. Power loss Ploss is made of switching loss Psw and a conduction loss Pon1.

In contrast, during loss-increasing control as shown in FIG. 6, before time t1, namely, when gate control signal GS is at the L level, voltage V≠0 at the switching element, and current I≠0 in the state where the switching element is in the completely off-state.

Further, at time t1, when gate control signal GS changes from the L level to the H level, current I increases and voltage V decreases. Voltage V in the completely on-state becomes higher than a voltage during normal control.

At time t2, when gate control signal GS changes from the H level to the L level, current I starts decreasing and voltage V increases. In the completely off-state, current I≠0.

During an actual switching operation, voltage V and current I vary in accordance with a change in gate voltage, so that power loss Ploss is generated. Power loss Ploss at this time exceeds power loss Ploss during normal control because a conduction loss Pon2 becomes larger than conduction loss Pon1 during normal control. Therefore, an amount of heat generated from inverter device 20 is increased, and battery 10 is quickly warmed.

It is noted that in inverter device 20, such loss-increasing control raises an element temperature of the switching element. The switching element has temperature dependence in which an element withstand voltage is increased as an element temperature rises. Therefore, the element withstand voltage of the switching element becomes higher than a counter-electromotive voltage generated by motor generators MG1, MG2, so that it is possible to prevent breakage of the switching element caused by exceedance of a withstand voltage, which breakage occurs at low temperatures.

Figure 7:
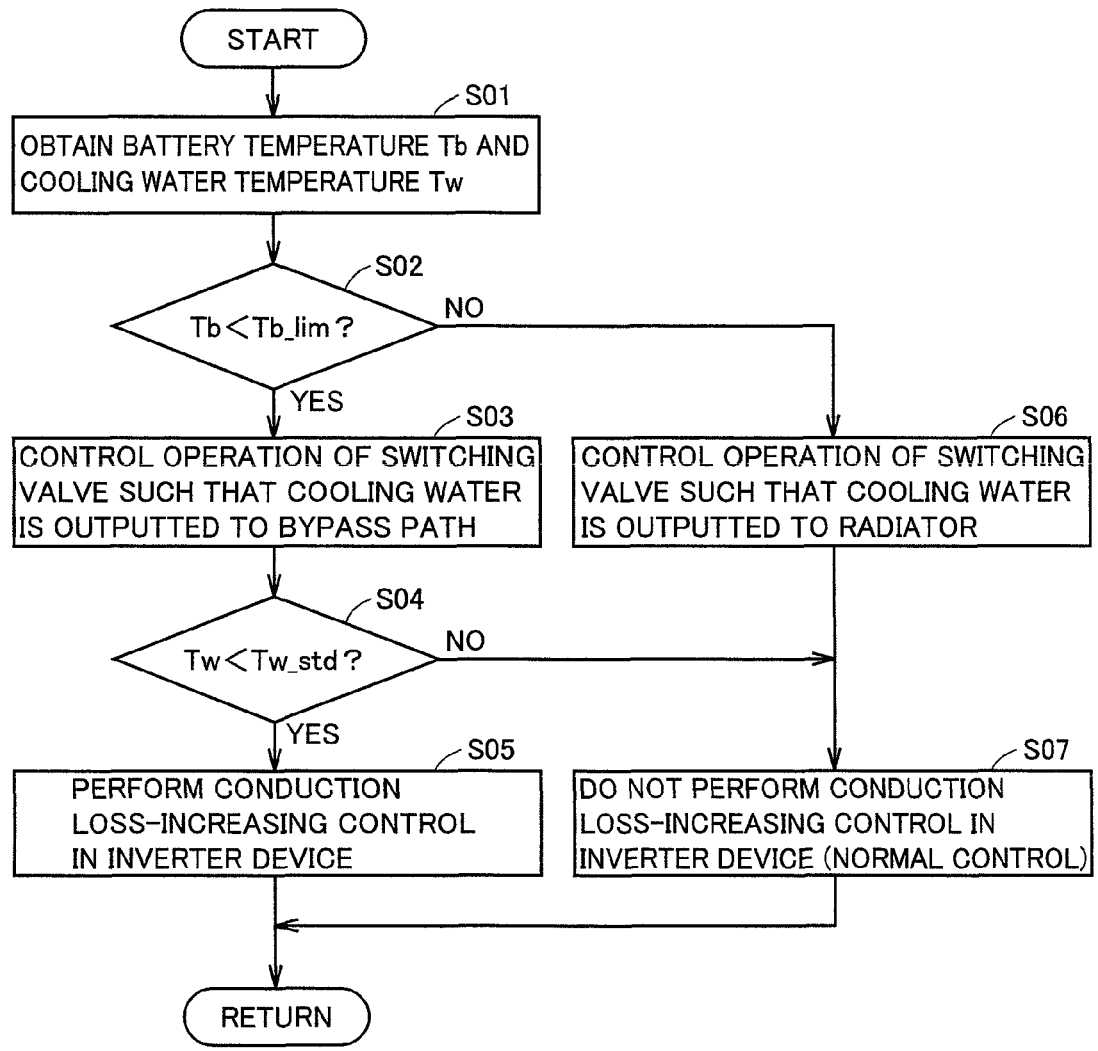
FIG. 7 is a flowchart for describing control of the cooling system according to an embodiment of the present invention.

FIG. 7 is a flowchart for describing control of the cooling system according to the embodiment of the present invention.

With reference to FIG. 7, when control device 30 obtains battery temperature Tb from temperature sensor 40 and cooling water temperature Tw from temperature sensor 42 (step S01), control device 30 determines whether or not battery temperature Tb is below prescribed temperature lower limit value Tb_lim (step S02). If battery temperature Tb is below prescribed temperature lower limit value Tb_lim, control device 30 controls an operation of switching valve 56 such that cooling water is outputted to bypass path 68 (step S03). The temperature-raising control of battery 10 is thereby started.

When the temperature-raising control of battery 10 is started, control device 30 determines whether or not cooling water temperature Tw is below prescribed temperature Tw_std (step S04). If cooling water temperature Tw is below prescribed temperature Tw_std, control device 30 performs loss-increasing control of inverter device 20. In other words, control device 30 varies a drive voltage (an on-voltage and an off-voltage) of the switching elements in inverter 14 (or 31) such that a conduction loss during a switching operation in inverter device 20 becomes larger than a conduction loss during normal control (step S05).

In contrast, in step S04, if cooling water temperature Tw is at least prescribed temperature Tb_std, control device 30 does not perform loss-increasing control of inverter device 20, and performs normal control (step S07).

Turning to step S02 again, if battery temperature Tb is at least prescribed temperature lower limit value Tb_lim, control device 30 controls an operation of switching valve 56 such that the cooling water is outputted to radiator 54 (step S06). Thereby the temperature-raising control of battery 10 is not performed, and inverter device 20, motor generators MG1, MG2, and battery 10 are cooled by the common cooling system. It is noted that if the temperature-raising control is not performed, control device 30 performs the normal control without performing the loss-increasing control of inverter device 20 shown in step S05 (step S07).

As described above, the cooling system according to the embodiment of the present invention adopts the configuration in which inverter device 20, motor generators MG1, MG2, and battery 10 are cooled by a single cooling system, so that it is possible to use heat generated from inverter device 20 and motor generators MG1, MG2 to effectively warm battery 10 in a low-temperature environment in which capacity of battery 10 is decreased.

Further, if an amount of heat generated at inverter device 20 and motor generators MG1, MG2 is small, a power loss of inverter device 20 is increased to increase the amount of generated heat, so that battery 10 is quickly warmed. Therefore, there is no need to provide a heater for warming battery 10.

Consequently, the cooling system having a small-sized, low-cost configuration makes it possible to ensure charge/discharge performance of battery 10 and improve operational reliability of motor generators MG1, MG2.

[First Modification]

In first and second modifications shown below, there will be described other configurations for performing loss-increasing control of inverter device 20. In the first modification, switching loss Psw in power loss Ploss of inverter device 20 is increased.

Figure 8:
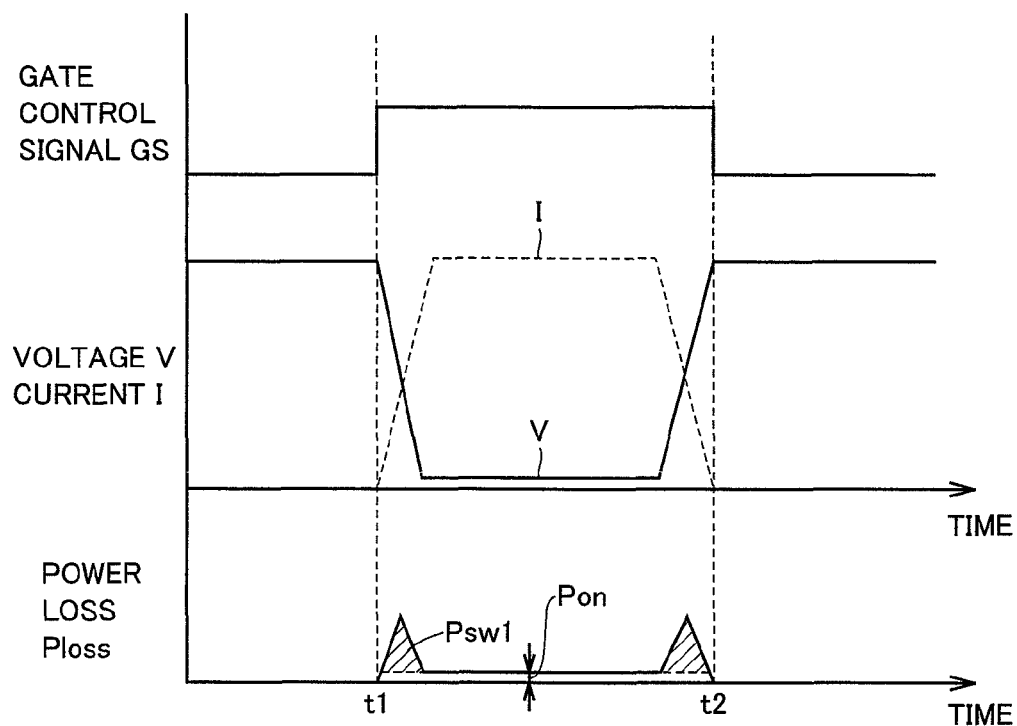
FIG. 8 is a drawing for describing a switching operation of the inverter device during normal control.
Figure 9:
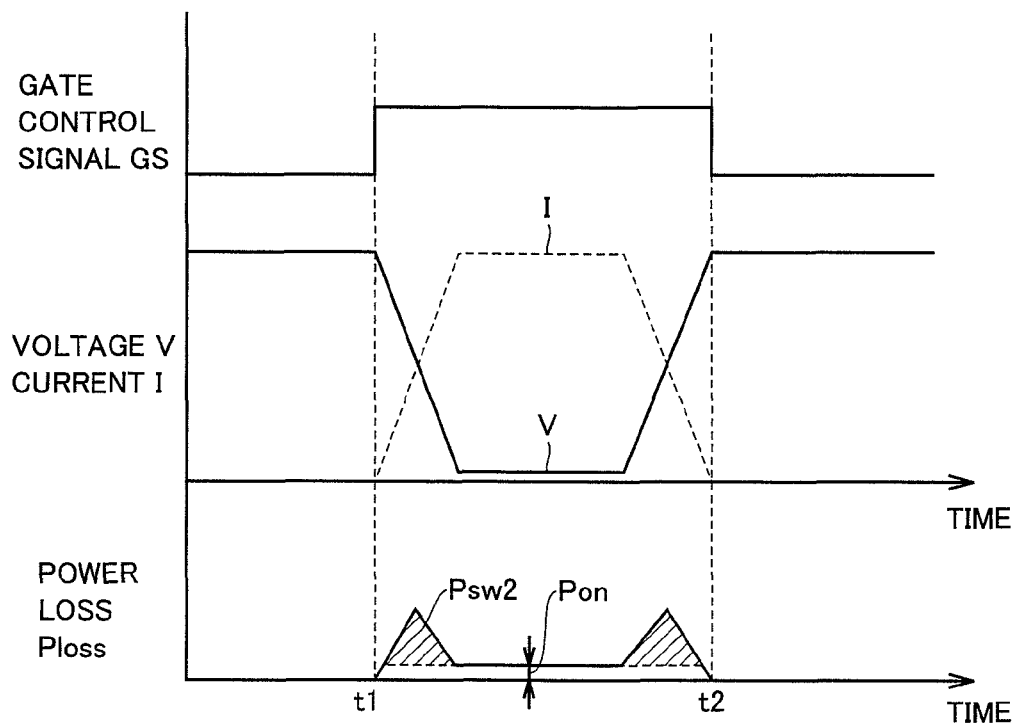
FIG. 9 is a drawing for describing a switching operation of the inverter device during loss-increasing control according to a first modification of the embodiment of the present invention.

FIG. 8 is a drawing for describing a switching operation of inverter device 20 during normal control, while FIG. 9 is a drawing for describing a switching operation of inverter device 20 during loss-increasing control according to the first modification. It is noted that since FIG. 8 is the same as that shown in FIG. 5, the detailed description thereof will not be repeated.

With reference to FIG. 9, the axis of ordinates shows gate control signal GS that controls on/off of the switching element, voltage V and current I at the switching element, and power loss Ploss during a switching operation, and the axis of abscissas shows time. In the first modification, a switching operation of inverter 14 is controlled such that a switching speed, which is identified as an opening/closing speed of the switching element, is made lower than a switching speed during normal control.

By lowering the switching speed, a rate at which voltage V and current I of the switching element vary becomes smaller. As a result, turn-on time and turn-off time of the switching element are increased, so that a switching loss Psw2 becomes larger than switching loss Psw1 during normal control. Thereby an amount of heat generated from inverter device 20 is increased and battery 10 is quickly warmed.

Figure 10:
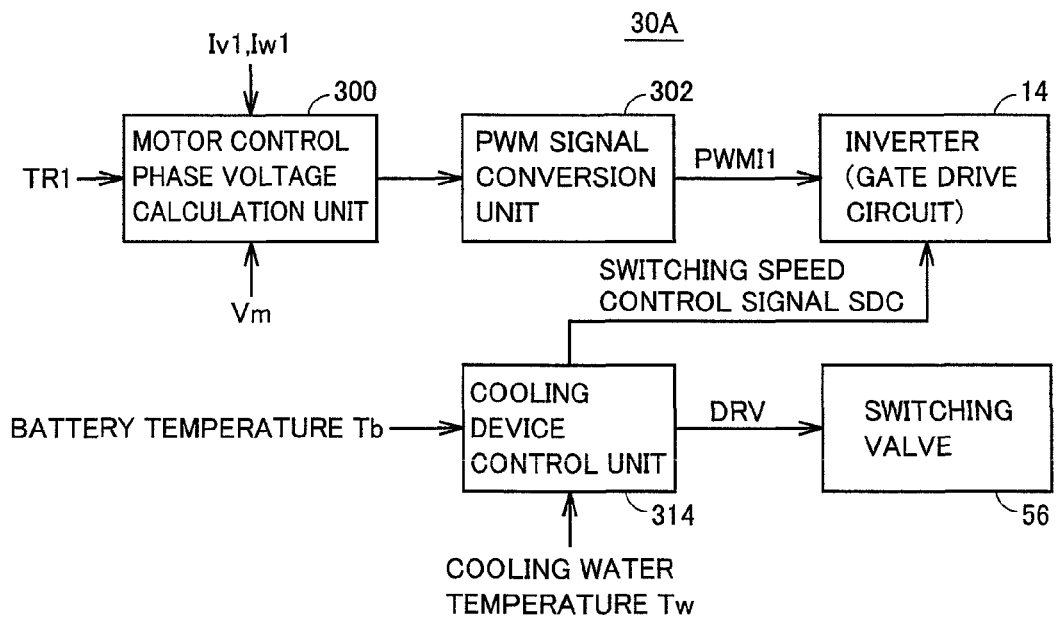
FIG. 10 is a functional block diagram of a control device in a load drive device to which a cooling system according to the first modification of the embodiment of the present invention is applied.

FIG. 10 is a functional block diagram of a control device in the load drive device to which the cooling system according to the first modification is applied. A control device 30A in FIG. 10 is the one in which cooling device control unit 304 in control device 30 in FIG. 3 is replaced with a cooling device control unit 314. Therefore, the detailed description of the common portions will not be repeated.

When cooling device control unit 314 receives battery temperature Tb from temperature sensor 40 and cooling water temperature Tw from temperature sensor 42, it determines whether or not battery temperature Tb is below prescribed temperature lower limit value Tb_lim. When battery temperature Tb is below prescribed temperature lower limit value Tb_lim, cooling device control unit 314 performs temperature-raising control of battery 10. In other words, cooling device control unit 314 generates signal DRV for controlling an operation of switching valve 56 such that cooling water from cooling medium path 64 is outputted to bypass path 68, and outputs the generated signal DRV to switching valve 56. Thereby, heat generated from inverter device 20 and motor generators MG1, MG2 is transported to battery 10 by means of the cooling water.

Further, cooling device control unit 314 determines whether or not cooling water temperature Tw from temperature sensor 42 is below prescribed temperature Tw_std. If cooling water temperature Tw is below prescribed temperature Tw_std, cooling device control unit 314 performs loss-increasing control of inverter device 20. Cooling device control unit 314 generates a signal SDC for controlling a switching speed of the switching elements in inverter 14 (hereinafter referred to as a switching speed control signal), and outputs the generated signal SDC to inverter 14.

Switching speed control signal SDC is inputted to the gate drive circuits disposed to correspond to the switching elements in inverter 14, respectively. The gate drive circuits make the switching speed variable in accordance with switching speed control signal SDC.

Figure 11:
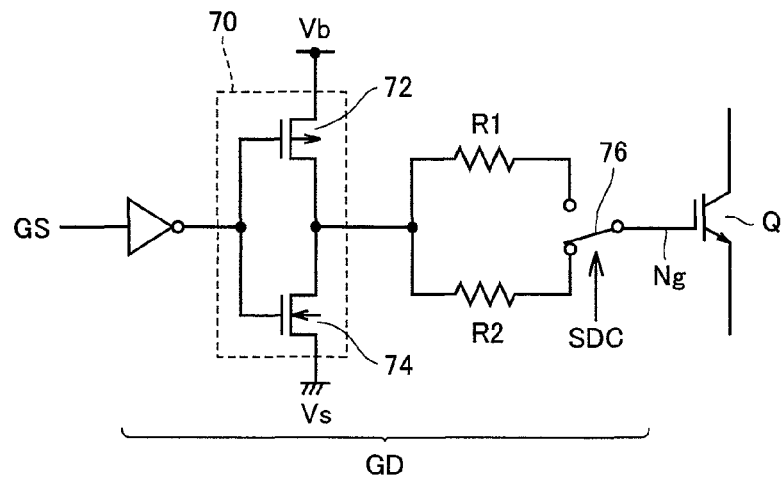
FIG. 11 is a circuit diagram that shows a configurational example of a gate drive circuit according to the first modification of the embodiment of the present invention.

FIG. 11 is a circuit diagram that shows a configurational example of the gate drive circuit of the first modification.

With reference to FIG. 11, a gate drive circuit GD has a drive unit 70, resistors R1, R2, and a switch 76. It is noted that gate drive circuit GD comprehensively shows gate drive circuits GD1-GD6 shown in FIG. 1.

Drive unit 70 has a p-type pull-up transistor 72 and an n-type pull-down transistor 74. P-type transistor 72 is connected between an on-voltage Vb and a node N1. N-type transistor 74 is connected between an off-voltage Vs and node N1. To the gates of p-type transistor 72 and n-type transistor 74, an inversion signal of gate control signal GS is provided in a shared manner.

Resistor R1 and resistor R2 are connected in parallel between node N1 and gate Ng. A resistance value of resistor R1 is smaller than a resistance value of resistor R2. Switch 76 is connected between gate Ng of a switching element Q and one terminal of each of resistors R1 and R2.

If switching speed control signal SDC is at the H level, switch 76 operates to connect one end of resistor R1 and gate Ng. In contrast, if switching speed control signal SDC is at the L level, switch 76 operates to connect one end of resistor R2 and gate Ng.

In accordance with gate control signal GS, one of p-type transistor 72 and n-type transistor 74 is turned on and the other of p-type transistor 72 and n-type transistor 74 is turned off. In other words, when gate control signal GS is at the H level, node N1 is connected to on-voltage Vb, and when gate control signal GS is at the L level, node N1 is connected to off-voltage Vs.

The gate resistor connected between the drive voltage (on-voltage Vb or off-voltage Vs) and gate Ng is variable in two stages in accordance with switching speed control signal SDC.

Therefore, during normal control, it is possible to set switching speed control signal SDC to the H level to suppress switching loss Pon1 to thereby perform the switching operation as shown in FIG. 8, and during loss-increasing control, it is possible to set switching speed control signal SDC to the L level to lower the switching speed to increase switching loss Pon2. As a result, an amount of heat generated from inverter device 20 is increased, so that battery 10 is quickly warmed.

It is noted that in inverter device 20, such loss-increasing control causes a rise in element temperature of the switching element, as described above, so that it is possible to prevent breakage of the switching element caused by exceedance of a withstand voltage, which breakage occurs at low temperatures.

Further, by lowering the switching speed, the so-called surge voltage is reduced. It is thereby possible to prevent the switching element from being broken by the surge voltage at low temperatures at which an element withstand voltage of the switching element is lowered.

Figure 12:
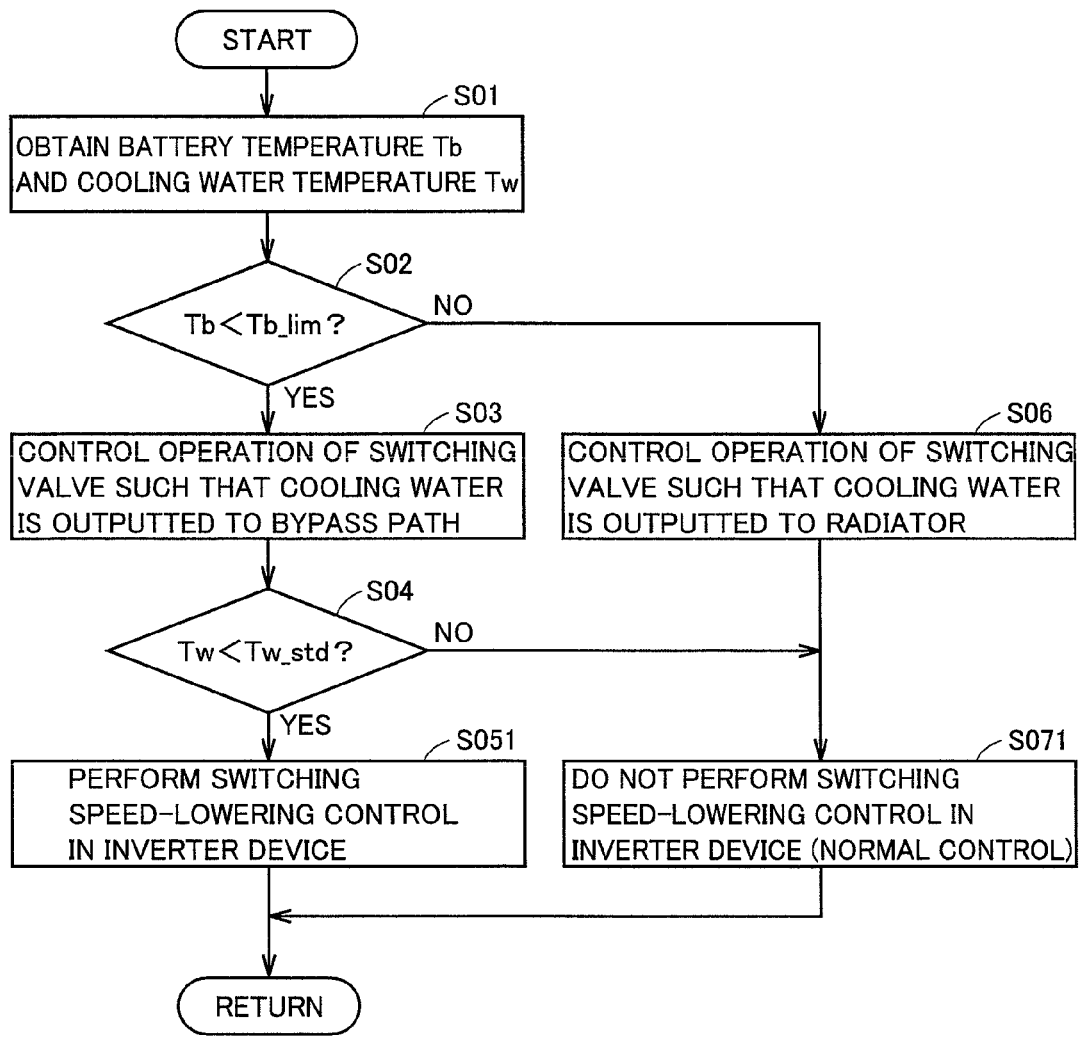
FIG. 12 is a flowchart for describing control of the cooling system according to the first modification of the embodiment of the present invention.

FIG. 12 is a flowchart for describing control of the cooling system according to the first modification of the embodiment of the present invention. The flowchart in FIG. 12 is the one in which step S05 and step S07 in the flowchart in FIG. 7 are replaced with step S051 and step S071. Therefore, the detailed description of the common steps will not be repeated.

With reference to FIG. 12, in step S04, if cooling water temperature Tw from temperature sensor 42 is below prescribed temperature Tw_std, control device 30A performs loss-increasing control of inverter device 20. In other words, the switching speed of the switching elements in inverter 14 (or 31) is lowered such that a switching loss during switching operations in inverter device 20 becomes larger than a switching loss during normal control (step S051).

In contrast, in step S04, if cooling water temperature Tw is at least prescribed temperature Tb_std, control device 30A performs normal control without performing loss-increasing control of inverter device 20 (step S071).

[Second Modification]

In the second modification, when loss-increasing control of inverter device 20 is to be performed, motor generators MG1, MG2 are driven such that motor efficiency of motor generators MG1, MG2 becomes lower than motor efficiency during normal control. In other words, motor generators MG1, MG2 are controlled such that a power loss is increased, while maintaining constant output torque.

Figure 13:
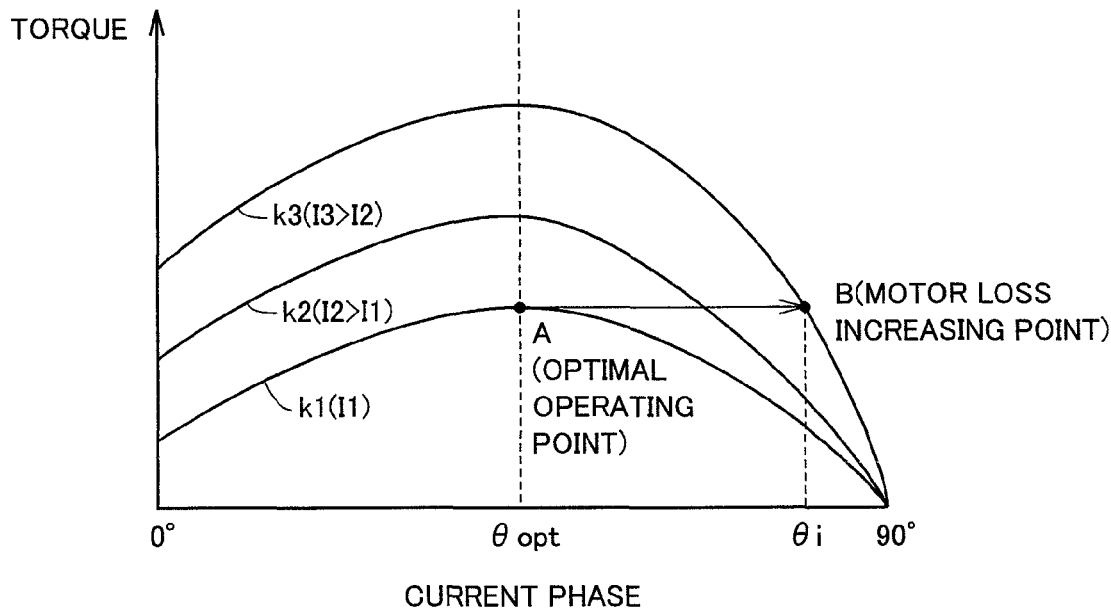
FIG. 13 is a drawing for describing control of motor generators according to a second modification of the embodiment of the present invention.

FIG. 13 is a drawing for describing control of motor generators MG1, MG2 according to the second modification of the embodiment of the present invention.

With reference to FIG. 13, a relationship between torque of motor generators MG1, MG2 and a current phase θ of a current (motor current) flowing through the motor generators is represented by curves k1-k3. It is noted that curves k1-k3 have motor current amplitudes different from one another. Curve k1 has the smallest amplitude (referred to as amplitude I1), and curve k3 has the largest amplitude (referred to as amplitude I3 (>I2>I1)).

In each of curves k1-k3, torque varies such that it becomes a maximum at a certain current phase θopt. Therefore, a current is generally allowed to flow through the motor generators at current phase θopt that causes maximum torque. In the following, an operating point A of the motor generators that achieves current phase θ=θopt is also referred to as an optimal operating point.

In contrast, in each of curves k1-k3, when current phase θ is shifted from θopt that provides optimal operating point A, torque is gradually decreased. In other words, motor efficiency is decreased by shifting current phase θ from θopt.

In the present modification, during loss-increasing control, motor generators MG1, MG2 are controlled such that motor efficiency is decreased, namely, a power loss is increased, while output torque is being kept constant.

Specifically, during loss-increasing control, as shown in FIG. 13, motor generators MG1, MG2 are driven at operating point B at which a current amplitude is equal to current amplitude I3, which is larger than current amplitude I1 at optimal operating point A, and current phase θ is equal to a current amplitude θi, which is shifted from current amplitude θopt at optimal operating point A. At operating point B, motor generators MG1, MG2 output torque equivalent to output torque at optimal operating point A. In the following, operating point B is also referred to as a motor loss increasing point.

It is noted that current phase θi at motor loss increasing point B may also be any of a higher phase and a lower phase with respect to current phase θopt.

As such, by driving motor generators MG1, MG2 such that motor efficiency is decreased, an amplitude of a current flowing through motor generators MG1, MG2 becomes larger than an amplitude during normal control. As a result, power loss Ploss of inverter device 20 is increased, so that an amount of heat generated from inverter device 20 is increased. Further, in motor generators MG1, MG2 as well, a power loss generated at the three-phase coil is increased, so that an amount of heat generated from motor generators MG1, MG2 is increased. Therefore, it is possible to further increase an amount of heat transported from inverter device 20 and motor generators MG1, MG2 to battery 10 by means of cooling water, and consequently, battery 10 is more quickly warmed.

Figure 14:
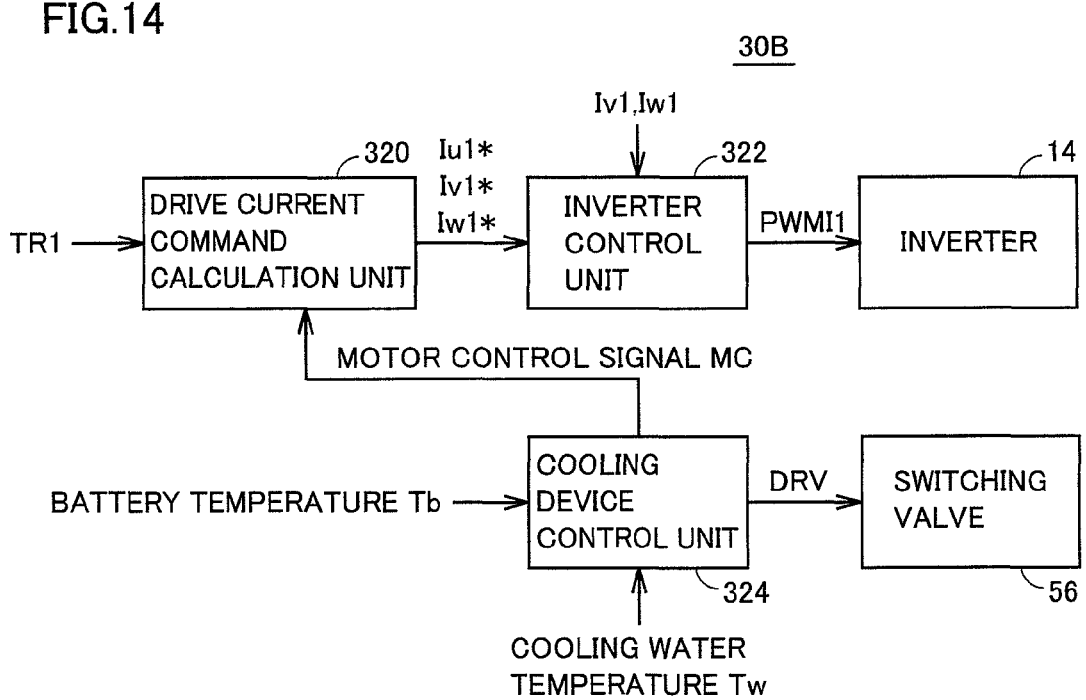
FIG. 14 is a functional block diagram of a control device in a load drive device to which the cooling system according to the second modification of the embodiment of the present invention is applied.

FIG. 14 is a functional block diagram of a control device in a load drive device to which the cooling system according to the second modification is applied.

With reference to FIG. 14, a control device 30B includes a drive current command calculation unit 320, an inverter control unit 322, and a cooling device control unit 324.

Drive current command calculation unit 320 generates drive current commands Iu*, Iv*, Iw* and outputs these drive current commands to inverter control unit 322 such that motor generator MG1 operates at optimal operating point A (FIG. 13), based on torque command value TR1 from the external ECU.

When inverter control unit 322 receives drive current commands Iu1*, Iv1*, Iw1* from drive current command calculation unit 320, and motor currents Iv1, Iw1 from current sensor 24, it generates signal PWMI1 for actually turning on/off each of switching elements Q1-Q6 in inverter 14, based on a deviation of the drive current commands from actual current values, and outputs the generated signal PWMI1 to inverter 14. Switching elements Q1-Q6 are opened/closed by gate drive circuits GD1-GD6 in response to signal PWMI1.

When cooling device control unit 324 receives battery temperature Tb from temperature sensor 40 and cooling water temperature Tw from temperature sensor 42, it determines whether or not battery temperature Tb is below prescribed temperature lower limit value Tb_lim. When battery temperature Tb is below prescribed temperature lower limit value Tb_lim, cooling device control unit 304 generates signal DRV for controlling an operation of switching valve 56 such that cooling water from cooling medium path 64 is outputted to bypass path 68, and outputs the generated signal DRV to switching valve 56.

Further, cooling device control unit 324 determines whether or not cooling water temperature Tw from temperature sensor 42 is below prescribed temperature Tw_std. If cooling water temperature Tw is below prescribed temperature Tw_std, cooling device control unit 324 performs loss-increasing control of inverter device 20. Cooling device control unit 304 generates a motor control signal MC, which is identified as a signal for instructing to drive inverter 14 such that motor efficiency of motor generator MG1 (or MG2) is decreased, and outputs the generated motor control signal MC to drive current command calculation unit 320.

Upon receipt of motor control signal MC, drive current command calculation unit 320 generates drive current commands Iu*, Iv*, Iw* and outputs the generated drive current commands to inverter control unit 322, based on torque command value TR1 from the external ECU, such that motor generator MG1 operates at motor loss increasing point B (FIG. 13). Inverter control unit 322 generates signal PWMI1 based on a deviation of the drive current commands from actual current values, and outputs the generated signal PWMI1 to inverter 14.

As described above, according to the second modification, during temperature-raising control of battery 10, control device 30B varies a current amplitude of motor generators MG1, MG2 in accordance with cooling water temperature Tw, while keeping output torque constant. Thereby a power loss of inverter device 20 and motor generators MG1, MG2 is varied, and as a result, an amount of heat generated from inverter device 20 and motor generators MG1, MG2 is varied.

It is noted that by performing loss-increasing control, a device temperature and a motor temperature are increased in inverter device 20 and motor generators MG1, MG2, respectively. An element withstand voltage of inverter device 20 is thereby increased. Further, in motor generators MG1, MG2, a counter-electromotive voltage is increased as the motor temperature is increased. As a result, it is possible to prevent breakage of the switching element caused by exceedance of a withstand voltage, which breakage occurs at low temperatures.

Figure 15:
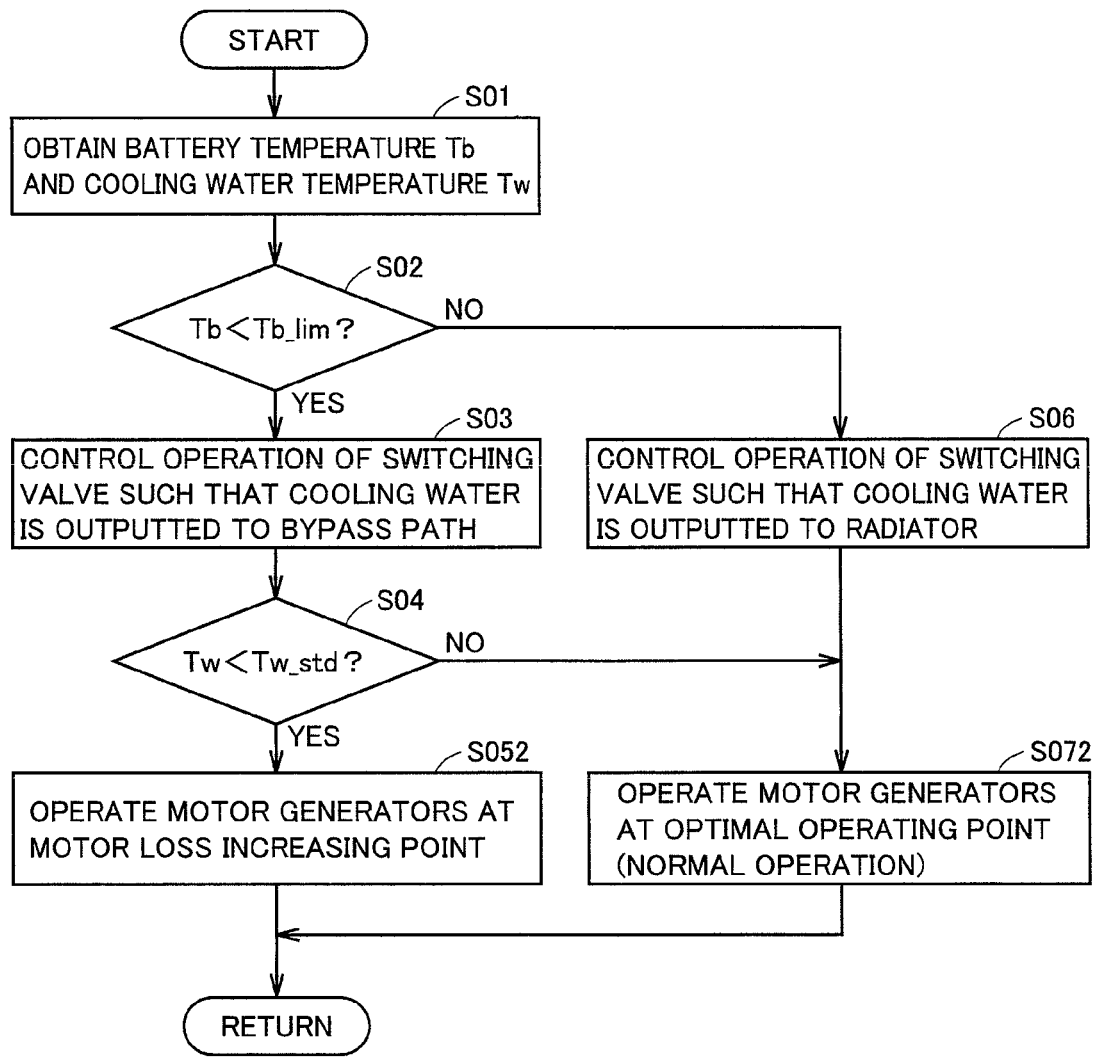
FIG. 15 is a flowchart for describing control of the cooling system according to the second modification of the embodiment of the present invention.

FIG. 15 is a flowchart for describing control of the cooling system according to the second modification of the embodiment of the present invention. The flowchart in FIG. 16 is the one in which step S05 and step S07 in the flowchart in FIG. 7 are replaced with step S052 and step S072. Therefore, the detailed description of the common steps will not be repeated.

With reference to FIG. 15, if cooling water temperature Tw from temperature sensor 42 is below prescribed temperature Tw_std in step S04, control device 30B performs loss-increasing control of inverter device 20. In other words, a switching operation of inverter device 20 is controlled such that motor generators MG1, MG2 operate at a motor loss increasing point B (FIG. 13) (step S052).

In contrast, in step S04, if cooling water temperature Tw is at least prescribed temperature Tb_std, control device 30B performs normal control without performing loss-increasing control of inverter device 20. In other words, control device 30B controls switching operations in inverter device 20 such that motor generators MG1, MG2 operate at optimal operating point A (FIG. 13) (step S072).

It is noted that although in the above-described embodiment, there has been described the configurational example in which the "drive circuit" that drives the electric load is the inverter device, the present invention can also be applied to a configuration in which the "drive circuit" is configured with a converter that performs voltage conversion between the power storage mechanism and the electric load.

Further, in the above-described embodiment, there has been described the configuration in which cooling water is used as a cooling medium. However, it may also be possible to adopt a configuration in which another cooling medium such as a cooling airflow is used.

Further, in the above-described embodiment, there has been described, as a representative example, the case in which a voltage-driven type element such as an IGBT and a MOSFET is used as a switching element used for the inverter device. However, a current-driven type element such as a bipolar transistor may also be used. It is noted that if a bipolar transistor is used as a switching element, conduction resistance is varied between in a state where the switching element is turned on and in a state where the switching element is turned off, by configuring the switching element such that a base current of the switching element is varied between during normal control and during loss-increasing control.

It should be understood that the embodiment disclosed herein is illustrative and not limitative in all aspects. The scope of the present invention is shown not by the description above but by the scope of the claims, and is intended to include all modifications within the equivalent meaning and scope of the claims.

Industrial Applicability

The present invention can be applied to a cooling system for a load drive device mounted on a vehicle.

The invention claimed is:

1. A cooling system, comprising:
    a load drive device having a power storage mechanism configured to be chargeable/dischargeable, and a drive circuit receiving supply of electric power from said power storage mechanism and driving an electric load;
    a cooling device cooling said load drive device; and
    a control device controlling an operation of said load drive device and an operation of said cooling device,
    said cooling device including a cooling medium path allowing a cooling medium to pass therethrough,
    said power storage mechanism being disposed to share said cooling medium path with said drive circuit,
    said control device including a temperature-raising control unit performing temperature-raising control of said power storage mechanism when a temperature of said power storage mechanism is below a prescribed temperature lower limit value, and
    said temperature-raising control unit including
        an estimation unit estimating an amount of heat generated from said drive circuit, and
        a drive control unit controlling said drive circuit such that a power loss generated at said drive circuit becomes larger than a power loss during normal control, when the amount of heat generated from said drive circuit, estimated by said estimation unit, falls short of an amount of heat required for warming said power storage mechanism.

2. The cooling system according to claim 1, wherein said cooling device includes
    a radiator disposed at said cooling medium path and cooling said cooling medium,
    a bypass path for bypassing said radiator, and
    a switching valve allowing said cooling medium to pass through any of said radiator and said bypass path, and
    said temperature-raising control unit further includes a switching valve control unit controlling an operation of said switching valve such that said cooling medium passes through said bypass path.

3. The cooling system according to claim 2, wherein
    said drive circuit includes an electric power converter which performs electric power conversion between said power storage mechanism and said electric load by a switching operation of a switching element, and
    said drive control unit controls said drive circuit such that a power loss generated during said switching operation becomes larger than the power loss during the normal control.

4. The cooling system according to claim 3, wherein said drive control unit controls a drive power supply of said switching element such that conduction resistance in a state where said switching element is turned on becomes higher than conduction resistance during the normal control.

5. The cooling system according to claim 3, wherein said drive control unit controls a drive power supply of said switching element such that conduction resistance in a state where said switching element is turned off becomes lower than conduction resistance during a normal operation.

6. The cooling system according to claim 3, wherein said drive control unit controls said drive circuit such that a switching speed of said switching element becomes lower than a switching speed during a normal operation.

7. The cooling system according to claim 6, wherein said drive control unit switches an electrical resistor electrically connected between a drive power supply of said switching element and a control electrode of said switching element, from a first resistance value to a second resistance value larger than said first resistance value.

8. The cooling system according to claim 3, wherein
said electric load is a rotating electrical machine, and
said drive control unit controls said drive circuit such that driving efficiency of said rotating electrical machine becomes lower than driving efficiency during a normal operation.

9. The cooling system according to claim 8, wherein
said rotating electrical machine operates at a first operating point which requires a drive current having a first current amplitude for generating requested torque, during the normal operation, and
said drive control unit controls said drive circuit such that said rotating electrical machine operates at a second operating point which requires a drive current having a second current amplitude for generating said same requested torque, said second current amplitude being larger than said first current amplitude.

10. The cooling system according to claim 1, wherein said estimation unit estimates the amount of heat generated from said drive circuit, based on any of a temperature of said cooling medium, a temperature of said drive circuit, and a drive current flowing through said drive circuit.

11. The cooling system according to claim 10, wherein said power storage mechanism is disposed to share said cooling medium path further with said electric load.

* * * * *